(12) United States Patent
Winand et al.

(10) Patent No.: US 9,455,573 B2
(45) Date of Patent: Sep. 27, 2016

(54) MAINS POWER ADAPTOR COMPRISING A FUEL CELL

(75) Inventors: Henri Winand, Loughborough (GB); Mark Bignell, Loughborough (GB); Michael Provost, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 332 days.

(21) Appl. No.: 13/983,480

(22) PCT Filed: Feb. 6, 2012

(86) PCT No.: PCT/GB2012/050254
§ 371 (c)(1),
(2), (4) Date: Nov. 8, 2013

(87) PCT Pub. No.: WO2012/107744
PCT Pub. Date: Aug. 16, 2012

(65) Prior Publication Data
US 2014/0057196 A1 Feb. 27, 2014

(30) Foreign Application Priority Data
Feb. 8, 2011 (GB) .................................. 1102150.8

(51) Int. Cl.
*H01M 8/04* (2006.01)
*H02J 1/00* (2006.01)
(Continued)

(52) U.S. Cl.
CPC ............ *H02J 1/00* (2013.01); *H01M 8/04201* (2013.01); *H01M 8/04208* (2013.01); *H01R 13/6675* (2013.01); *H02J 3/387* (2013.01); *H01M 8/0432* (2013.01); *H01M 8/04373* (2013.01); *H01M 8/04425* (2013.01); *H01M 2008/1095* (2013.01); *H01M 2250/30* (2013.01);
(Continued)

(58) Field of Classification Search
CPC .......... H01R 13/6675; Y10T 307/658; Y10T 307/669; Y10T 307/675
USPC ................................ 363/146; 307/72, 74, 75
See application file for complete search history.

(56) References Cited

U.S. PATENT DOCUMENTS 3,496,520 A 2/1970 Reynolds
5,701,244 A * 12/1997 Emmert .................. H01F 27/02
363/146

(Continued)

FOREIGN PATENT DOCUMENTS

CN 1578048 A 2/2005
CN 1820389 A 8/2006
(Continued)

*Primary Examiner* — Fritz M Fleming
(74) *Attorney, Agent, or Firm* — Baker & Hostetler LLP (57) ABSTRACT

A mains power adaptor (1) incorporating a fuel cell (5) for providing alternative power to a low voltage portable device when no mains power is available. The adaptor (1) includes electrical pins (4) configured to connect with a mains power supply socket; a power converter circuit (7) having an input coupled to the electrical pins (4) for converting mains power to a lower voltage supply (8); an electrical output (2) of the lower voltage supply (8); and a fuel cell (5) switchably coupled to said electrical output. The adaptor (1) has a fluid connection port (12) for coupling a fluid fuel outlet of a fuel cartridge (not shown) to a fuel inlet of the fuel cell (5) and the fluid connection port (12) is disposed in a face (3) of the adaptor (1) from which the electrical pins (4) extend. A valve of the fuel cartridge is operable by engagement with the electrical pins (4) of the adaptor (1).

11 Claims, 8 Drawing Sheets (51) Int. Cl.
  *H01R 13/66* (2006.01)
  *H02J 3/38* (2006.01)
  *H01M 8/10* (2016.01)

(52) U.S. Cl.
  CPC ............... *Y02B 90/18* (2013.01); *Y02E 60/50* (2013.01); *Y02E 60/521* (2013.01); *Y10T 307/615* (2015.04)

(56) References Cited

U.S. PATENT DOCUMENTS

| | | | |
|---|---|---|---|
| 6,104,162 A | | 8/2000 | Sainsbury et al. |
| 6,548,986 B1 | * | 4/2003 | Jakubowski ............ G06F 1/263 320/111 |
| 2003/0054220 A1 | | 3/2003 | Barton et al. |
| 2005/0007063 A1 | | 1/2005 | Sekai |
| 2005/0008903 A1 | | 1/2005 | Bourilkov et al. |
| 2005/0040785 A1 | | 2/2005 | Barnes et al. |
| 2005/0089734 A1 | | 4/2005 | Norimatsu |
| 2005/0186456 A1 | | 8/2005 | Andreas-Schott et al. |
| 2008/0003482 A1 | | 1/2008 | Komiyama et al. |
| 2009/0059636 A1 | * | 3/2009 | Ho ............................ H02J 7/34 363/146 |
| 2009/0128088 A1 | | 5/2009 | Bourilkov et al. |

FOREIGN PATENT DOCUMENTS

| | | | | |
|---|---|---|---|---|
| EP | 1 193 804 | | 4/2002 | |
| EP | 1 355 371 | | 10/2003 | |
| GB | 2487924 B | * | 6/2013 | ........ H01M 8/04201 |
| GB | 2673826 B1 | * | 4/2015 | ........ H01M 8/04201 |
| JP | 2005-027450 A | | 1/2005 | |
| JP | 2007/247799 | | 10/2007 | |
| JP | 2007-265945 A | | 10/2007 | |
| JP | 2008-004565 A | | 1/2008 | |
| WO | WO 2005/011045 | | 2/2005 | |
| WO | WO 2010/062251 | | 6/2010 | |
| WO | WO 2010/062251 A1 | | 6/2010 | |

* cited by examiner

MAINS POWER ADAPTOR COMPRISING A FUEL CELL

The present invention relates to fuel cells as an alternative supply of power to devices normally powered by a mains power supply.

Many people now routinely carry a number of portable electronic devices with them, such as a mobile telephone, a personal music player, a portable computer, a personal gaming device and the like. These devices routinely require connection to a mains power supply for extended operation of the device or for recharging the device. As a consequence, it is often necessary to carry one or more mains power adaptors for converting a mains power supply to the required low voltage supply of the portable electronic device.

A problem often encountered when travelling is that there may be no convenient access to a mains power supply so that a conventional mains adaptor is then of no assistance and the use of a portable electronic device becomes limited by its internal battery life.

It is an object of the present invention to provide a convenient alternative to a mains power supply for powering portable electronic devices when a mains power supply is not available.

According to one aspect, the present invention provides a mains power adaptor comprising: electrical pins configured to connect with a mains power supply socket; a power converter circuit having an input coupled to the electrical pins for converting mains power to a lower voltage supply; an electrical output of the lower voltage supply; and a fuel cell switchably coupled to said electrical output.

The adaptor may include a fluid connection port for coupling a fluid fuel outlet of a fuel cartridge to a fuel inlet of the fuel cell. The fluid connection port may be disposed in a face of the adaptor from which the electrical pins extend. The fluid connection port may be disposed between the electrical pins. The adaptor may include a receptacle for engaging with a fuel cartridge and enabling coupling of the fluid connection port to the fuel outlet of the fuel cartridge. The electrical output may include a data connection. The adaptor may include a data processor for communicating with a device coupled to the electrical output and for transmitting usage data thereto. The usage data may comprise data relating to any of: fuel supply remaining in a fuel cartridge coupled to the adaptor, status or condition of the fuel cell within the adaptor; power usage data. The electrical pins may be detachable, interchangeable or reconfigurable. The processor may be configured to determine an amount of fuel remaining in a cartridge coupled thereto by any one or more of: sensing absolute fuel pressure; sensing the response of fuel pressure to flow change; sensing the response of fuel pressure to temperature change (ambient and/or cartridge temperature); sensing the response of fuel pressure to ambient pressure change; operation of an algorithm based on fuel usage and/or flow from the cartridge. The electrical pins may be formed on a pin plate detachable from a housing of the adaptor, the pin plate having an interface configured to physically and electrically couple the electrical pins to the housing of the adaptor, the housing of the adaptor having a face plate configured to engage with the pin plate interface. The adaptor may include a fuel cartridge having an interface configured to physically engage with the face plate as an alternative to the pin plate. The face plate may include a fluid connection port for coupling a fluid fuel outlet of the fuel cartridge to a fuel inlet of the fuel cell.

According to another aspect, the present invention provides a fuel cartridge for a fuel cell, comprising: a fuel chamber; a fuel outlet for releasing fuel from the cartridge, the fuel outlet including a switchable valve; and a pin-receiving interface configured to receive and engage with the electrical pins of a domestic electrical plug.

The switchable valve of the fuel outlet may be inhibited from opening unless electrical pins of a mains power adaptor are engaged with the pin-receiving interface and the fuel outlet is coupled to the fluid connection port of the power adaptor. The fuel cartridge may include a data processor configured to communicate data relating the status of the cartridge to an adaptor coupled thereto. The data processor may be configured to communicate data to an adaptor when coupled thereto using the electrical pins of the adaptor engaged with the pin-receiving interface.

According to another aspect, the invention provides an interface unit for interfacing between a mains power adaptor as described above and a fuel cartridge, the interface unit comprising: a pin-receiving interface configured to receive and engage with the electrical pins of the mains power adaptor described above; a receptacle for engaging with a fuel cartridge; a fluid conduit extending through the interface unit configured to couple to the fluid connection port of the power adaptor and to a fuel cartridge when engaged with the receptacle.

The interface unit may include a control mechanism configured to actuate fuel flow from a fuel cartridge when connected to the interface unit, the control mechanism being configured to inhibit fuel flow unless the electrical pins of the mains power adaptor are engaged with the pin-receiving interface. The interface unit may be configured to communicate data between the mains power adaptor and fuel cartridge.

Embodiments of the present invention will now be described by way of example and with reference to the accompanying drawings in which.

Figure 1:
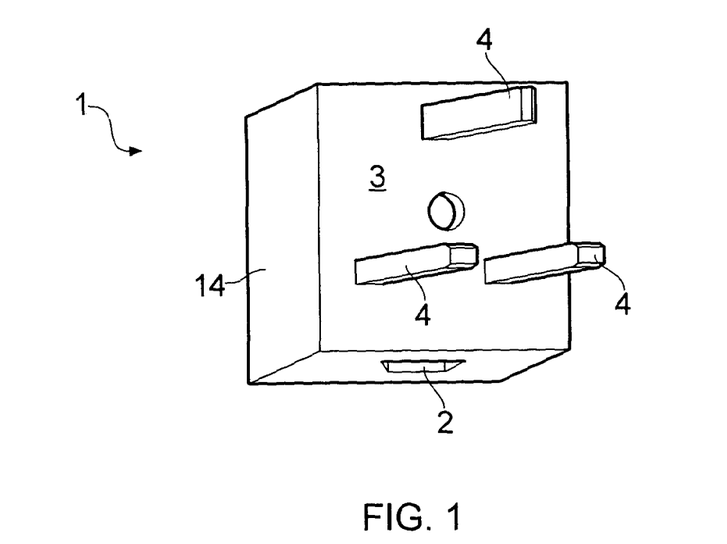
FIG. 1 is a perspective view of a fuel cell adaptor that provides a low voltage output from either a mains power socket or a fuel cell.

With reference to FIG. 1, a fuel cell adaptor 1 is configured to provide a low voltage output connector 2 suitable for powering a range of portable electronic devices such as mobile telephones, personal music players, portable computing devices and the like.

The low voltage output connector 2 is shown as a standard format mini-USB socket 2 but this low voltage output connector can take any suitable format such as a USB socket, a micro-USB socket, a power socket, a permanently-attached cable with a plug on the distal end, or a connector socket array with multiple formats of connector for different portable devices.

The adaptor 1 has a mating face 3 from which projects a number of electrical pins 4 of a conventional format suitable for engaging with a domestic mains electrical power outlet. The electrical pins 4 may be of any suitable configuration for the country in which the adaptor 1 is intended to be used. Thus, the schematic diagram of FIG. 1 depicts a UK-style three rectangular pin configuration with earth, live and neutral pins 4. Alternative configurations may be used, such as the European standard round two- or three-pin configurations or US-style blade pins.

The electrical pins 4 could be interchangeable to suit multiple national formats to make the adaptor 1 a "universal" adaptor compatible with mains power systems in many countries. One way of achieving this multi-country compatibility is to form the electrical pins on a separate plate which can be slid into place on the mating face 3 of the adaptor 1 so that the user or manufacturer can pre-configure the adaptor prior to use. Another way of achieving this is with pins 4 that are adjustable in their position(s). Thus, in a general aspect, the electrical pins 4 may be detachable from the housing of the adaptor 1 and/or interchangeable and/or generally reconfigurable.

Figure 2:
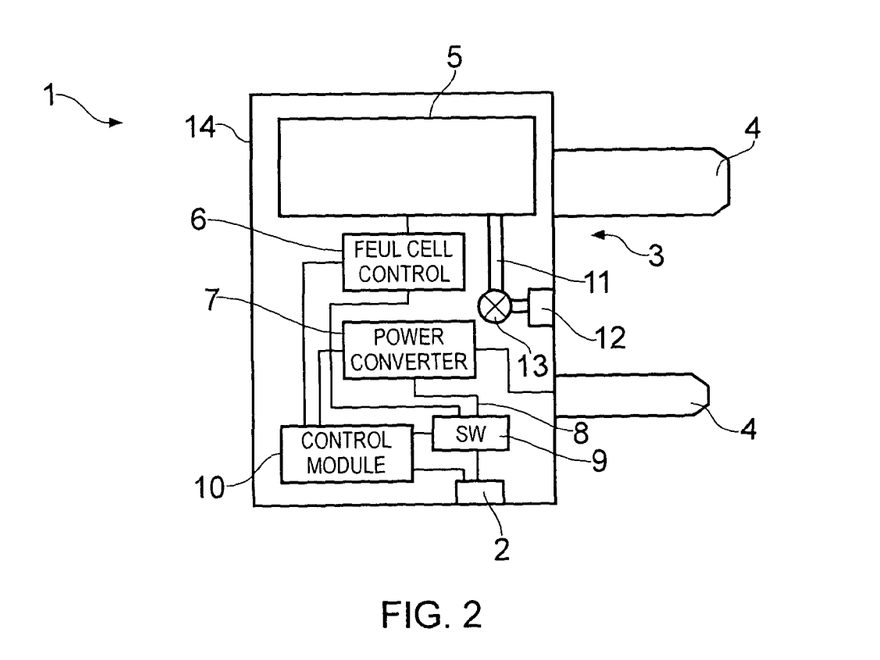
FIG. 2 is a schematic cross-sectional side view of the fuel cell adaptor of FIG. 1 showing internal functional aspects.

Referring also to FIG. 2, contained within the adaptor 1 is a compact fuel cell 5. Preferably, the fuel cell 5 is a fuel cell stack of the proton exchange membrane variety, e.g. a polymer electrolyte membrane fuel cell stack configured to produce an electrical output using hydrogen fuel delivered to an anode and oxygen delivered to an open cathode arrangement, as well known in the art. However, other types of fuel cell may be used within the scope of this disclosure, such as those using butane or methanol fuel.

The adaptor 1 also includes a control circuit 6 for controlling operation of the fuel cell 5, and a voltage conversion circuit 7 configured to convert mains voltage electrical power from the pins 4 to a suitable low voltage for an appliance to be used with the adaptor 1. The voltage conversion circuit 7 may preferably be a switched mode power supply as well known in the art. The low voltage output 8 may, for example, be 5 V for compatibility with the USB standard and with a great many portable appliances. The low voltage output 8 could be automatically or manually adjustable according to the type of portable device plugged in to the adaptor, e.g. operable to provide a range of possible voltages between, e.g. 3 and 24 V. The low voltage output 8 is connected to the low voltage output socket 2 by way of a switch 9. There may be multiple parallel low voltage outputs 8 if the adaptor is provided with multiple low voltage output sockets or other connectors 2. The voltage conversion circuit 7 could also be configured to regulate output voltage of the fuel cell 5 to the output connector 2 when and if necessary.

The adaptor 1 preferably also includes a control module 10 for providing a number of control functions for the adaptor to be described hereinafter. The adaptor is also provided with a fuel conduit 11 for delivery of hydrogen or other fuel to the fuel cell 5 from a fluid connection port 12 disposed on the mating face 3 of the adaptor 1. A switchable valve 13 may be provided in the fuel conduit for isolating the fuel cell 5.

The switch 9 may be under the control of control module 10 to switch the low voltage output 2 to receive power from the fuel cell when it is detected that the fuel cell is operational and generating sufficient capacity and to isolate the fuel cell when mains power is sensed on the pins 4.

The adaptor 1 includes a housing 14 which houses the fuel cell 5, output connector 2 and the various circuits 6, 7, 9, 10. The housing 14 may include ventilation slots (not shown) for providing air flow to the open cathode of the fuel cell 5.

An important consideration in the design of an electrical adaptor for providing a low voltage supply from a mains socket is to keep the adaptor as small and as portable as possible. An additional consideration when attempting to integrate a fuel cell into such an adaptor is how to maintain this small size while still providing a suitable receptacle into which a fuel cartridge may be plugged.

In one aspect of the present design, it has been recognised that the electrical pins 4, when not in use for connection to a mains power supply, can conveniently be used to provide a connection mechanism for attachment of a fuel cartridge to the adaptor. As shown in FIGS. 1 and 2, the fluid fuel connection port 12 is provided in the mating face 3 such that this mating face provides the mating face both for a mains socket and for a fuel cartridge.

Figure 3:
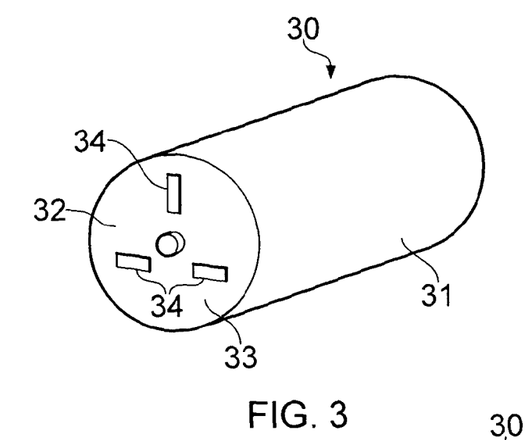
FIG. 3 is a perspective view of a fuel cartridge suitable for use with the adaptor of FIG. 1.

Referring now to FIG. 3 there is shown a fuel cartridge 30 suitable for use with the adaptor 1 of FIG. 1. The fuel cartridge 30 comprises a body 31 having a mating face 32 into which is formed a pin-receiving interface 33 configured to receive and engage with the electrical pins 4 of the adaptor 1. Thus, in the arrangement shown, the pin-receiving interface 33 includes three pin sockets 34 each configured to receive and engage with the three pins 4 of the adaptor 4. It will be understood that each of these pin sockets 34 can be configured to receive any suitable configuration of electrical mains plug according to the pin configurations available for the adaptor 1. In a preferred arrangement, the pin sockets 34 may be of the universal type that admit many different configurations of mains plugs from different countries, i.e. capable of receiving, and engaging with, any or all of round-pin plugs, square- or rectangular-pin plugs and blade pin plugs, all of varying spacing according to national and international mains power supply standards.

Figure 4:
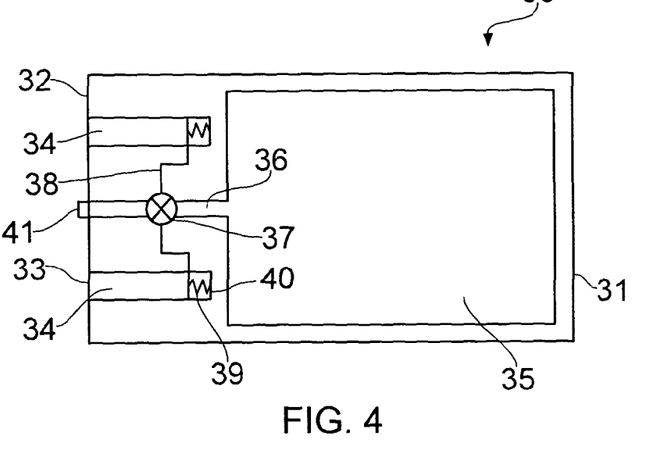
FIG. 4 is a schematic cross-sectional side view of the fuel cartridge of FIG. 4 showing internal functional aspects.

With reference to FIG. 4, the fuel cartridge includes a fuel chamber 35, a fuel conduit 36, a switchable valve 37 for sealing the fuel chamber 35 and a valve actuation mechanism 38 for opening and closing the valve 37. The valve actuation mechanism 38 is preferably configured to be operable by the insertion of a suitable set of electrical pins 4 into one or more of the pin sockets 34. In one arrangement, shown schematically in FIG. 4, the valve actuation mechanism 38 may be a mechanical arrangement in which the valve 37 is directly operated by the displacement of a spring-loaded plunger 39 installed in the distal end 40 of at least one of the pin sockets 34. Thus, in operation, the valve 37 is of a normally-closed configuration and the displacement of the plunger 39 by an adaptor pin 4 results in the opening of the valve 37 when the adaptor pin 4 is fully engaged in the socket 34. The valve actuation may be conditional on engagement of all pins 4 of the adaptor in the pin-receiving interface 33, or one or more pins.

The fuel cartridge 30 may also include a short stub end outlet 41 configured to engage with and into a recess of the connection port 12 of the adaptor 1. The stub may also be configured to open valve 13 in the adaptor 1.

The valve 37 may generally be electronically, mechanically or electromechanically actuated and actuation may be either manually or automatically implemented/initiated. For example, the insertion of the electrical pins 4 into at least one of the pin sockets 34 may be configured to cause an electrical connection to be made within the pin sockets thereby actuating the valve 37. In a general aspect, the switchable valve 37 is inhibited from opening unless electrical pins of the mains power adaptor 1 are engaged with the pin-receiving interface and the fuel outlet 41 of the cartridge 30 is coupled to the fluid connection port 12 of the adaptor 1.

In a preferred arrangement as shown, the fuel conduits 11 and 36 and the respective connection port 12/fuel outlet 41 are disposed between the electrical pins 4 for optimal security of engagement, although the conduits and connection port/fuel outlet could be disposed elsewhere on the mating faces 3 and 32 including at the edges thereof.

The control module 10 of the adaptor 1 is preferably configured to provide a number of beneficial features of the adaptor 1. The control module 10 may be configured to monitor the health and/or status of the fuel cell 5. The control module 10 may be configured to determine the performance of the fuel cell 5. The control module 10 may be configured to determine the fuel level in a coupled cartridge 30, for example by monitoring pressure, flow rate and other parameters. The control module 10 may also be configured to monitor the status/condition of an electrical device coupled to the low voltage output connector 2.

In the preferred configuration shown, the low voltage output connector 2 is a USB or mini-USB connector and is therefore also readily available as a data connection to the device being powered by the adaptor 1. This means that data relating to the operational status of fuel cell or to the cartridge and/or the adaptor as a whole can be communicated to the device being powered by the adaptor. For example, in the case of a mobile telephone or other personal computing device, status information relating to the adaptor and/or fuel cartridge can be transmitted to the mobile telephone or other personal computing device via the USB connector for display of the information on the mobile device, or for providing an alert to the user of the adaptor. The status information may also be transmitted further (e.g. by the mobile telephone over the cellular telephone network or by a computing device over a wireless or wired internet connection) to a third party who can be alerted to any need for maintenance of the fuel cell adaptor, fuel cartridge or for resupply of replacement fuel cartridges for example. In this way, the user of the adaptor may be assured of continuing optimal performance of the fuel cell adaptor 1. In a general aspect, the data connection may be used to transmit usage data comprising data relating to any of fuel supply remaining in a fuel cartridge coupled to the adaptor, status or condition of the fuel cell within the adaptor; and power usage data etc.

The data connection may also be used to transmit data from the connected device to the control module 10 of the adaptor 1. This enables the controller to determine the nature of a device connected thereto, its status or power requirements or other information that can then be used by the control module 10 to alter the operational characteristics of the adaptor 1.

Monitoring of the fuel level in the fuel cartridge 30 may be performed by the control module 10 in a number of possible ways. This can be by way of sensing absolute fuel pressure; sensing the response of fuel pressure to flow change; sensing the response of fuel pressure to temperature change (ambient and/or cartridge temperature); sensing the response of fuel pressure to ambient pressure change. The fuel level may also be computed by algorithm based on fuel usage/flow from a specific cartridge. The cartridge identity and therefore its expected capacity or other information may be determined directly from the cartridge itself.

For example, the use of the electrical pins 4 of the adaptor 1 as an engagement mechanism with the fuel cartridge 30 and an actuation mechanism for switching the valve 37 can confer the advantageous feature that the pins 4 can form an electrical pathway for transmitting and receiving electrical data signals between the fuel cartridge 30 and the adaptor 1. These data signals may communicate fuel cartridge identity information, capacity information, flow rate information, pressure information etc to the control module 10 in the adaptor 1. Alternatively, this information could be transmitted from the cartridge 30 to the adaptor 1 using a different communication path, such as a wireless communication path.

It will be appreciated that the fuel cartridges 30 may not always conveniently be able to provide a universal pin-receiving interface 33. It may therefore be advantageous to provide an interface unit for interfacing between an adaptor 1 and a generic fuel cartridge 30. Such an interface unit 50 is shown schematically in FIG. 5.

Figure 5:
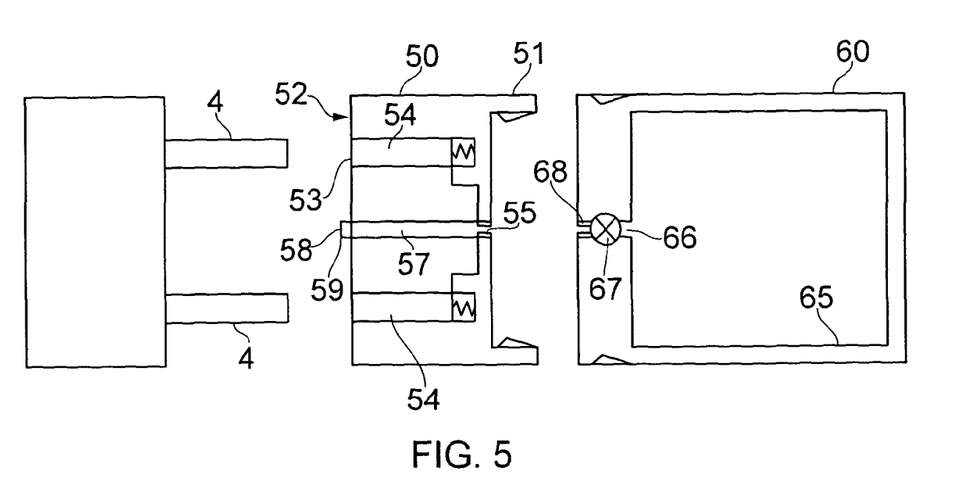
FIG. 5 is a schematic cross-sectional side view of an interface unit and fuel cartridge for use with the adaptor of FIG. 1.

Interface unit 50 preferably comprises a mating face 52 that is analogous to mating face 32 of the fuel cartridge 30 and a pin-receiving interface 53 comprising pin sockets 54 analogous to pin-receiving interface 33 and pin sockets 34 of the fuel cartridge 30. The interface unit also includes a fuel conduit 57 extending therethrough with a short stub end outlet 58 configured to engage with and into a recess of the connection port 12 of the adaptor 1. The stub may also be configured to open valve 13 in the adaptor 1.

A separate fuel cartridge 60 comprises a fuel chamber 65, a fuel conduit 66, and a switchable valve 67 for sealing the fuel chamber 65 and a valve actuation mechanism for opening and closing the valve 67. The valve actuation mechanism may comprise a plunger 68.

The valve actuation mechanism also includes components in the interface unit 50. Similar to the arrangements described in connection with fuel cartridge 30, the valve actuation mechanism is preferably operable by the insertion of a suitable set of electrical pins 4 into one or more of the pin sockets 54 in the interface unit 50. In one arrangement, the valve actuation mechanism may include a mechanical arrangement comprising a spring-loaded plunger 55 installed in the distal end 56 of at least one of the pin sockets 54. This plunger 55 communicates with the plunger 68 in the fuel cartridge 60 to which the interface unit 50 is connected.

Thus, in operation, the valve 67 in fuel cartridge 60 is normally closed but is opened by the combined operation of plunger 55 and plunger 68 caused by engagement of electrical pins 4 engaging with and into pin sockets 54. The displacement of the plunger 68 by the plunger 55 of the interface unit results in the opening of the valve 67 when the adaptor pin 4 is fully engaged. The valve actuation may be conditional on engagement of all pins 4 of the adaptor in the pin-receiving interface 53 or by only one or more of the pins.

The valve 67 may generally be electronically, mechanically or electromechanically actuated and actuation may be either manually or automatically implemented/initiated. For example, the insertion of the electrical pins 4 into at least one of the pin sockets 54 may be configured to cause an electrical connection to be made within the pin sockets thereby actuating the valve 57. In a general aspect, the switchable valve 67 is inhibited from opening unless electrical pins of the mains power adaptor 1 are engaged with the pin-receiving interface 53 and a fuel outlet 59 of the interface unit 50 is coupled to the fluid connection port 12 of the adaptor 1.

In a preferred arrangement as shown, the fuel conduits 11 and 57 and the respective connection port 12/fuel outlet 59 are disposed between the electrical pins for optimal security of engagement, although the conduits and connection port/fuel outlet could be disposed elsewhere on the mating faces 3 and 52 including at the edges thereof.

It will be understood that this interface unit enables a generic fuel cartridge 60 to be used with the adaptor 1. The interface unit 50 includes a receptacle 51 for engaging with the generic fuel cartridge 60 in any suitable manner. The receptacle 51 may comprise a recess in the end of the interface unit 50 for receiving the cartridge 60 therein. The receptacle may comprise one or more lugs or engagement members for gripping or engaging with the cartridge 60. The interface unit could be otherwise affixed to (e.g. by screws or bolts to a cartridge 60, in which case it will be recognised that the cartridge 60 has, in effect, been converted into the equivalent of cartridge 30 of FIG. 4.

The interface unit 50 may also be configured to communicate data between the fuel cartridge 60 and the adaptor 1, in similar manner to that described earlier.

In another arrangement 5, the adaptor 1 may include a receptacle or housing for directly receiving and/or engaging with a fuel cartridge 60 and enabling coupling of a fluid connection port to the fuel outlet of the fuel cartridge without use of the electrical pins 4. One such arrangement is now described in connection with FIGS. 6, 7 and 8.

Figure 6:
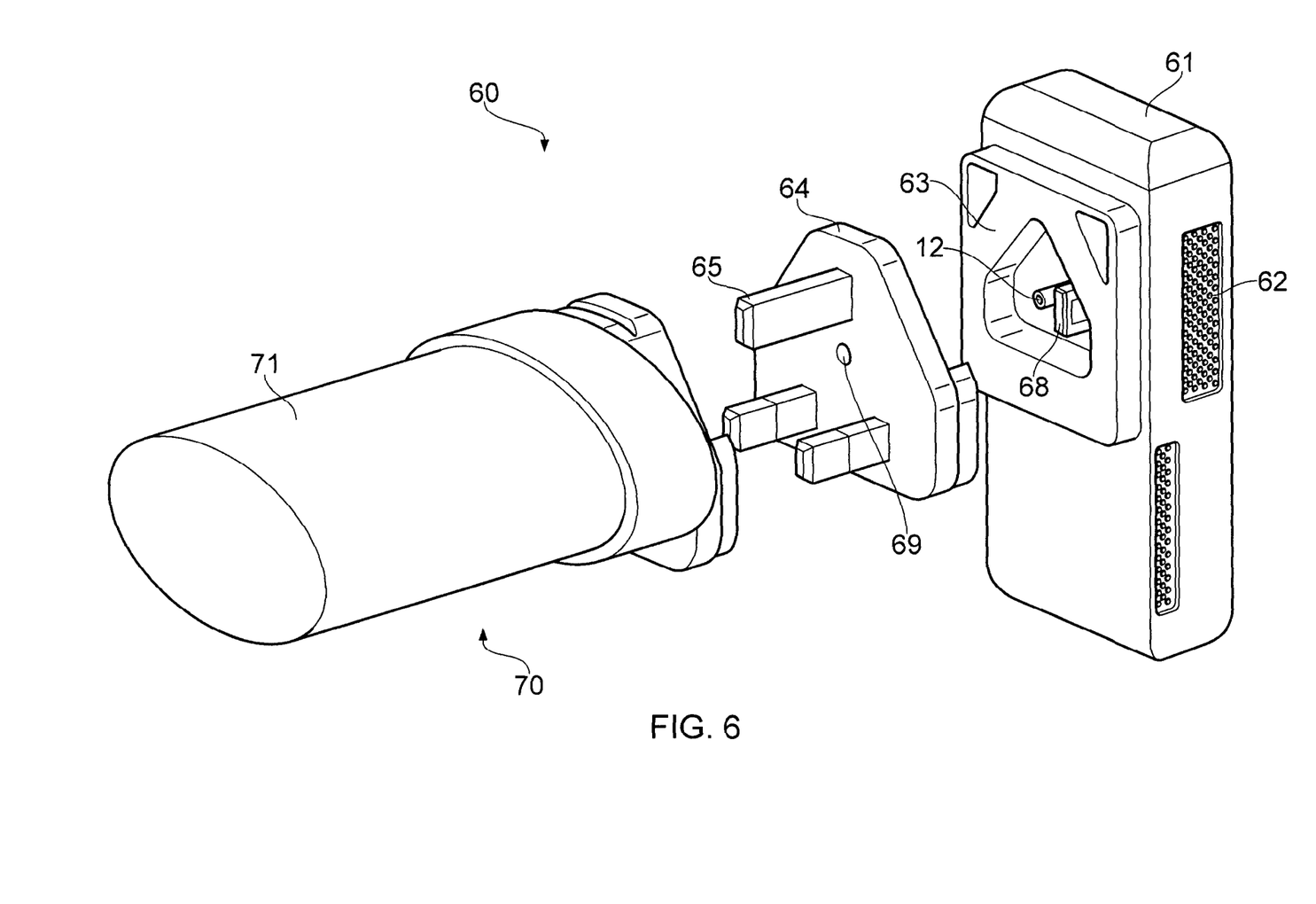
FIG. 6 is a perspective view of a fuel cell adaptor comprising a fuel cell housing, a mains plug attachment and a fuel cartridge.
Figure 7:
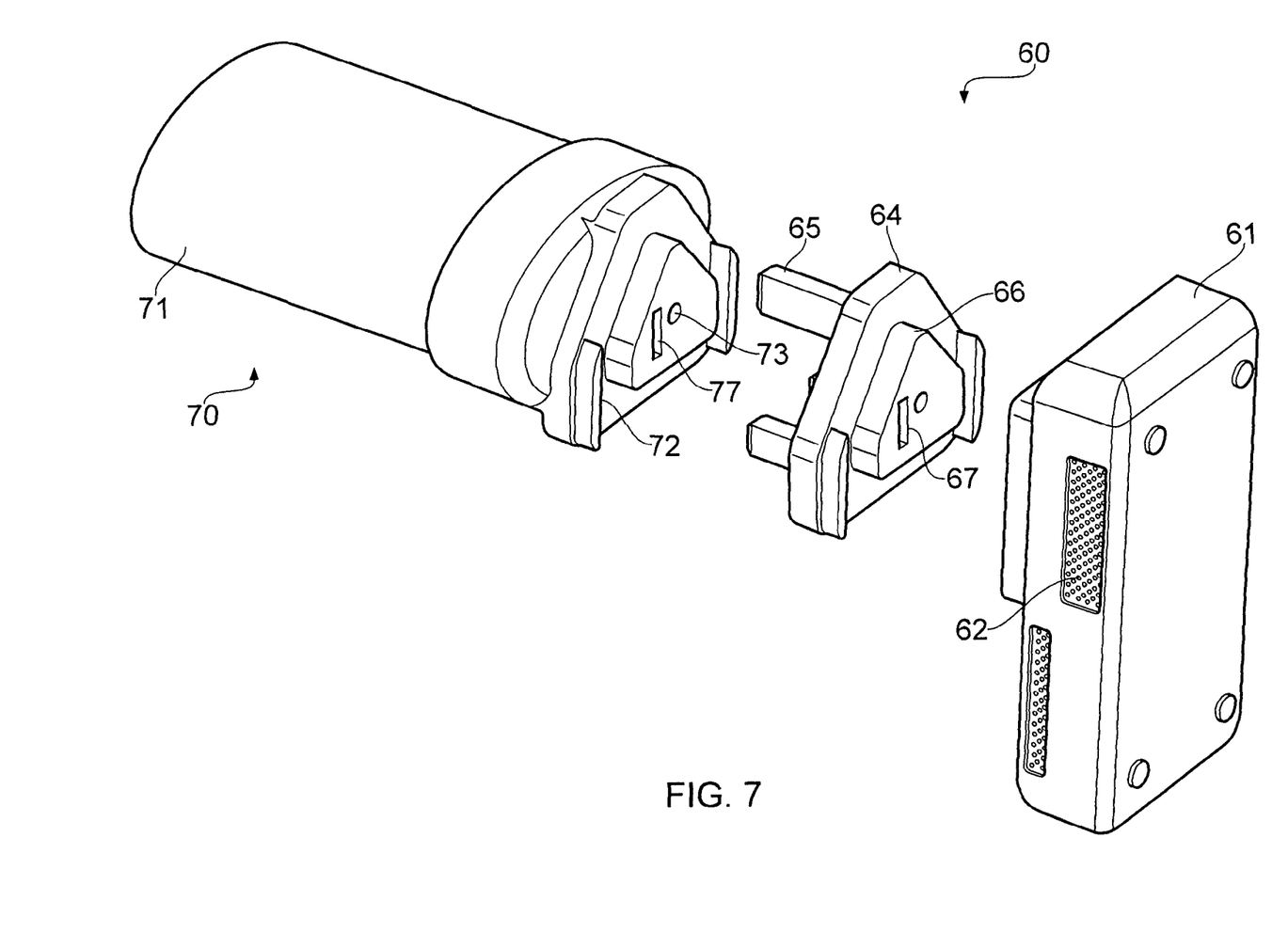
FIG. 7 is an alternative perspective view of the fuel cell adaptor of FIG. 6.

In FIGS. 6 and 7, a fuel cell adaptor 60 comprises a housing 61 which may contain the fuel cell 5, control circuit 6, voltage conversion circuit 7, low voltage output 8, switch 9, control module 10, fuel conduit 11, valve 13 and output connector 2 all as described in connection with FIG. 2, but not shown here. Ventilation panels 62 may be provided on one or more faces of the housing 61 for providing air flow to an open cathode of the fuel cell. The adaptor housing 61 includes a face plate 63 which provides for connection to electrical pins or a fuel cartridge as will be described.

Electrical pins 65 are formed on a pin plate 64. The electrical pins 65 and pin plate 64 may be configured in a suitable format for engaging with a domestic mains electrical power outlet. The electrical pins 65 may be of any suitable configuration for the country in which the adaptor 60 is intended to be used, and the adaptor could be supplied with multiple pin plates 64 for each desired country configuration. FIG. 6 depicts a UK-style three rectangular pin configuration with earth, live and neutral pins 65, and alternative configurations of pin plate may provide the European standard round two- or three-pin configurations or US-style blade pins, for example. The expression "pin plate" is intended to encompass any physical structure capable of supporting the required electrical pins in the appropriate disposition(s) and having an interface configured to couple to the face plate 63 of the housing 61.

The pin plate 64 may include an orifice 69 into which, or through which, can extend a fluid fuel connection port 12 in the face plate 63 on the adaptor housing 61. Referring to FIG. 7 to see the back of the pin plate 64, this provides an interface 66 configured to physically and electrically engage with the face plate 63 of the adaptor housing 61. Preferably, this includes an aperture 67 which provides recessed electrical terminals coupled to the pins 65. These recessed electrical terminals connect to a terminal post 68 in the face plate 63. Recessing the electrical terminals provides a measure of safety in case the pin plate 64 is inappropriately introduced into a mains electrical outlet while not coupled to the adaptor housing 61.

It will be recognised that when the pin plate 64 is coupled to the adaptor housing 61, the combined unit can be functionally equivalent to the adaptor 1 of FIG. 2 and can perform all of the functions of engaging with a fuel cartridge 30 of FIGS. 3 and 4, or an interface unit 50 of FIG. 5.

However, this configuration offers a number of further possibilities for also engaging with a fuel cartridge directly, without use of the pin plate 64. In the arrangement shown, a fuel cartridge 70 comprises a body 71 having a mating face 72 configured to engage with the face plate 63 of the housing 61 when the pin plate 64 is detached from the housing 61. The mating face 72 includes a fuel outlet 73 preferably disposed in the mating face 72 which is configured to couple with the fuel connection port 12 in the face plate 63. The mating face 72 preferably also includes an aperture 77 of similar configuration to aperture 67 in the pin plate 64 to allow electrical communication with the fuel cartridge, if required. The fuel cartridge 70 otherwise may include the fuel chamber 35, fuel conduit 36, switchable valve 37 and outlet 41 all as described in connection with FIG. 4.

Figure 8:
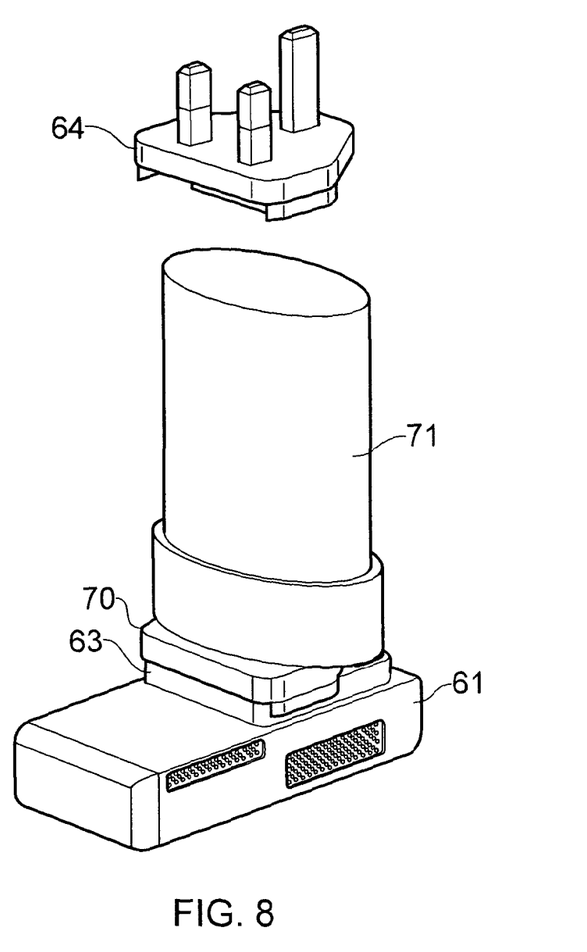
FIG. 8 is a perspective view of the fuel cell housing and fuel cartridge of FIG. 6 when assembled for fuel cell operation.

The fuel cartridge 70 may also include a valve actuation mechanism 38 and plunger 39 similar to those described in connection with FIG. 4. In this case, however, this would be actuated not by electrical pins 4 or 65, but by the electrical terminal post 68 of the face plate 63 on housing 61. Actuation of the fuel cartridge 70 can then be effected when the cartridge 70 is directly coupled to the face plate 63, as is shown in FIG. 8. It can thus be understood that the fuel cartridge 70 has a mating face 72 that is configured to physically engage with the face plate 63 as an alternative to the pin plate 64. The fuel cartridge may also have a mating face that can also be configured to electrically connect with the face plate 63, if electrical communication is required for the communication functions previously described in connection with earlier embodiments.

Figure 9:
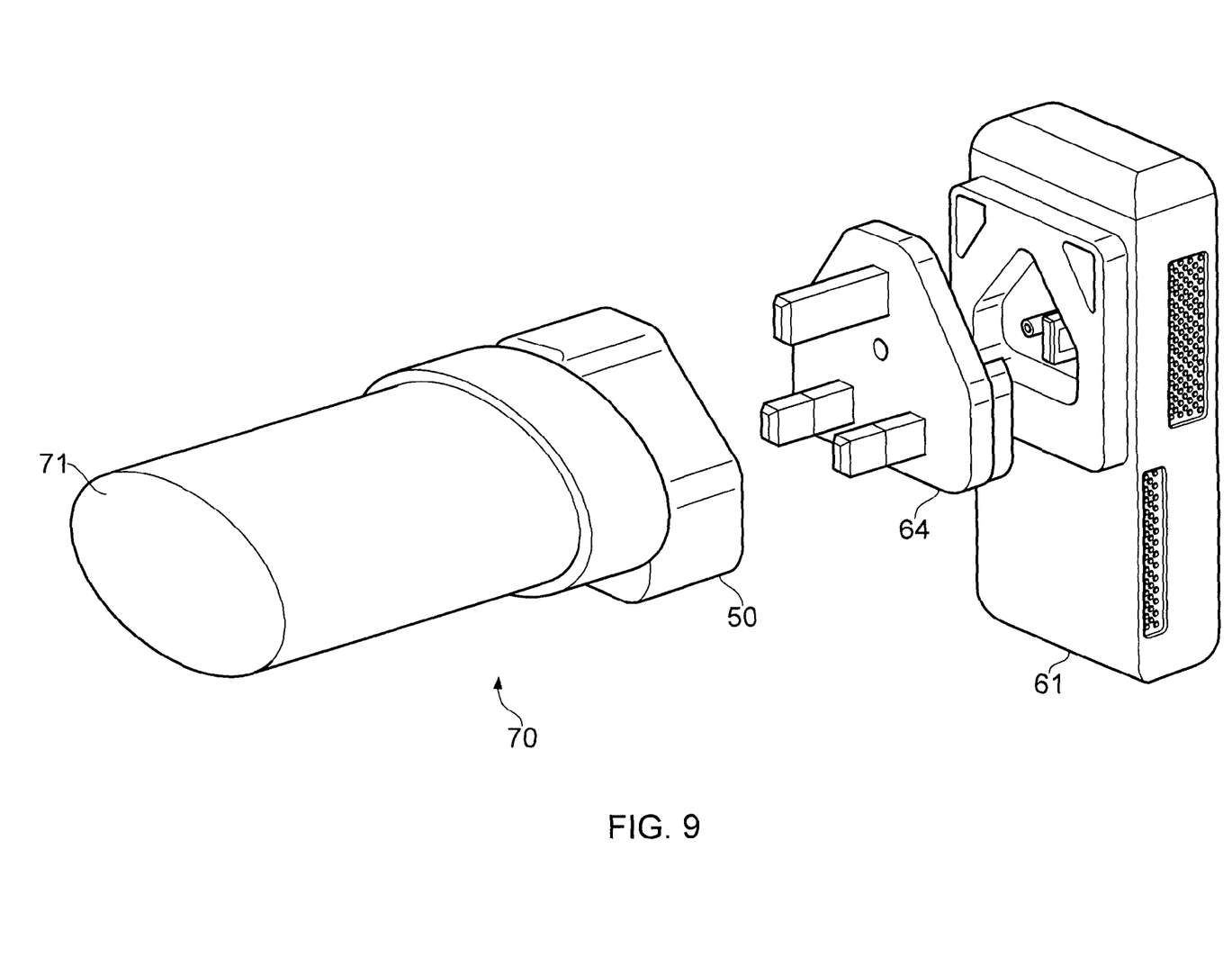
FIG. 9 is a perspective view of a fuel cell adaptor comprising a fuel cell housing, a mains plug attachment, an interface unit and a fuel cartridge.
Figure 10:
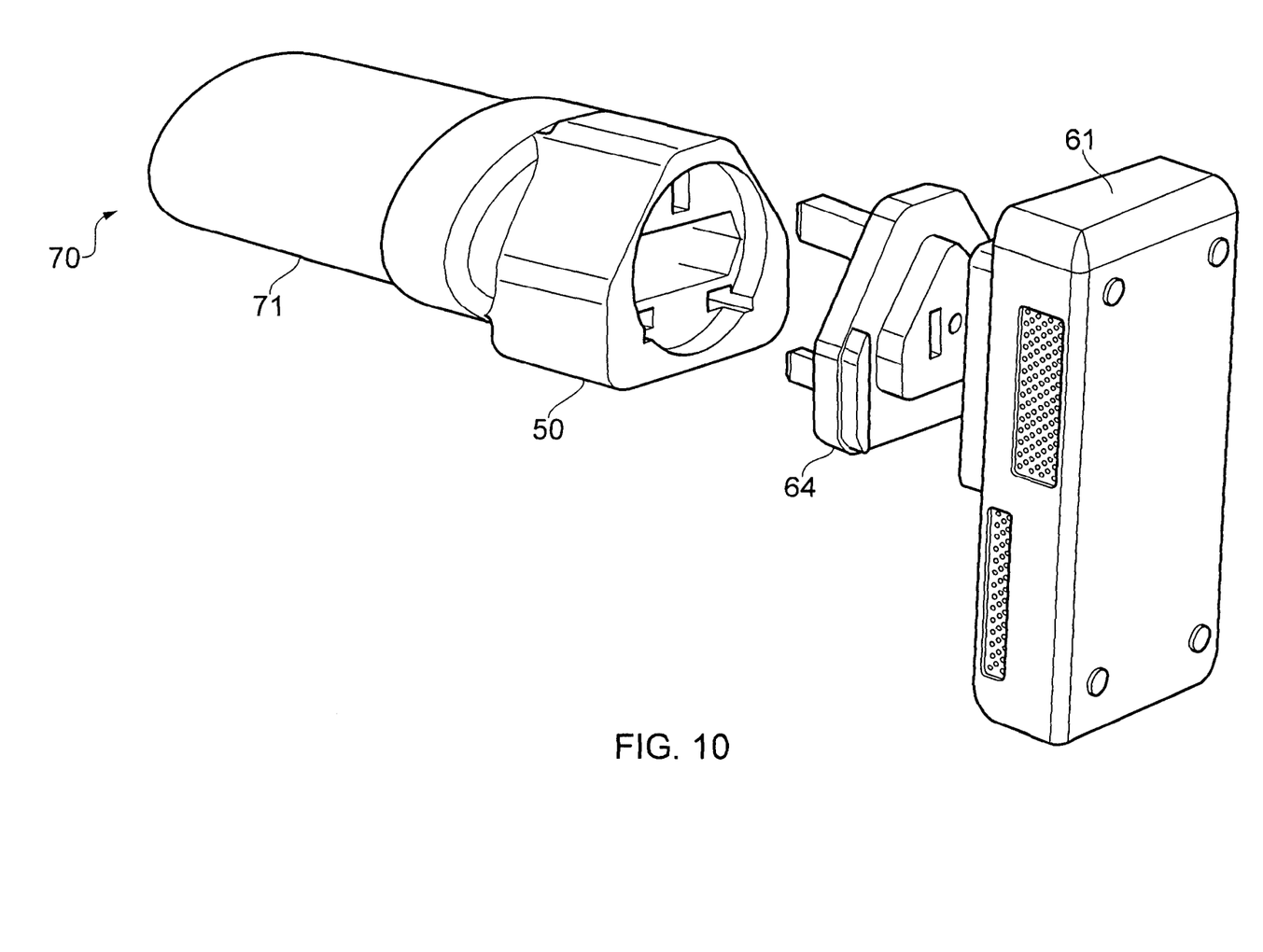
FIG. 10 is an alternative perspective view of the fuel cell adaptor of FIG. 9.
Figure 11:
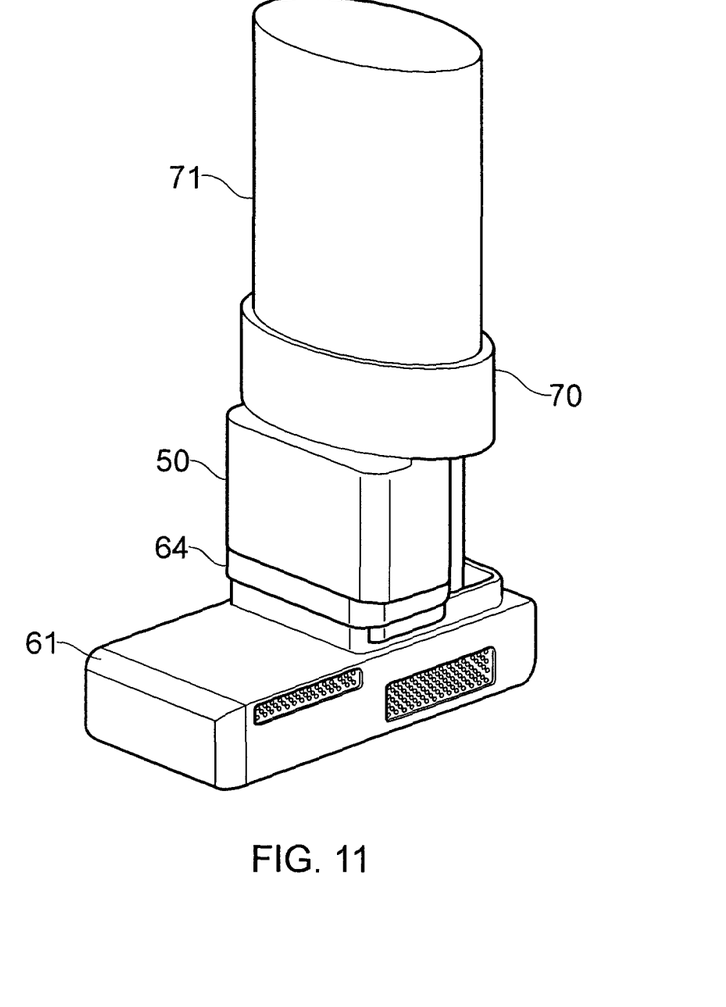
FIG. 11 is a perspective view of the fuel cell adaptor of FIG. 9 when assembled for fuel cell operation.

As explained earlier, the housing 61, pin plate 64 and fuel cartridge 70 can also be used in conjunction with an interface 50 such as described in connection with FIG. 5. An exemplary arrangement is shown in FIGS. 9 to 11. The interface unit 50 may have the relevant features as previously described.

Other embodiments are intentionally within the scope of the accompanying claims.

The invention claimed is:

1. A mains power adaptor comprising:
   electrical pins configured to connect with a mains power supply socket;
   a power converter circuit having an input coupled to the electrical pins for converting mains power to a lower voltage supply;
   a fluid connection port disposed in a face of the adaptor from which the electrical pins extend for coupling a fluid fuel outlet of a fuel cartridge to a fuel inlet of the fuel cell;
   an electrical output of the lower voltage supply; and,
   a fuel cell switchably coupled to said electrical output.

2. The adaptor of claim 1 in which the fluid connection port is disposed between the electrical pins.

3. The adaptor of claim 1 further including a receptacle for engaging with a fuel cartridge and enabling coupling of the fluid connection port to the fuel outlet of the fuel cartridge.

4. The adaptor of claim 1 in which the electrical output includes a data connection.

5. The adaptor of claim 4 further including a data processor for communicating with a device coupled to the electrical output and for transmitting usage data thereto.

6. The adaptor of claim 5 in which the usage data comprises data relating to any of: fuel supply remaining in a fuel cartridge coupled to the adaptor; status or condition of the fuel cell within the adaptor; power usage data.

7. The adaptor of claim 1 in which the electrical pins are detachable, interchangeable or reconfigurable.

8. The adaptor of claim 6 in which the processor is configured to determine an amount of fuel remaining in a cartridge coupled thereto by any one or more of: sensing absolute fuel pressure; sensing the response of fuel pressure to flow change; sensing the response of fuel pressure to temperature change (ambient and or cartridge temperature); sensing the response of fuel pressure to ambient pressure change; operation of an algorithm based on fuel usage and or flow from the cartridge.

9. The adaptor of claim 8 in which the electrical pins are formed on a pin plate detachable from a housing of the adaptor, the pin plate having an interface configured to physically and electrically couple the electrical pins to the housing of the adaptor, the housing of the adaptor having a face plate configured to engage with the pin plate interface.

10. The adaptor of claim 9 further including a fuel cartridge, the fuel cartridge having an interface configured to physically engage with the face plate as an alternative to the pin plate.

11. The adaptor of claim 10 in which the face plate further includes a fluid connection port for coupling a fluid fuel outlet of the fuel cartridge to a fuel inlet of the fuel cell.

* * * * *